UNITED STATES PATENT OFFICE.

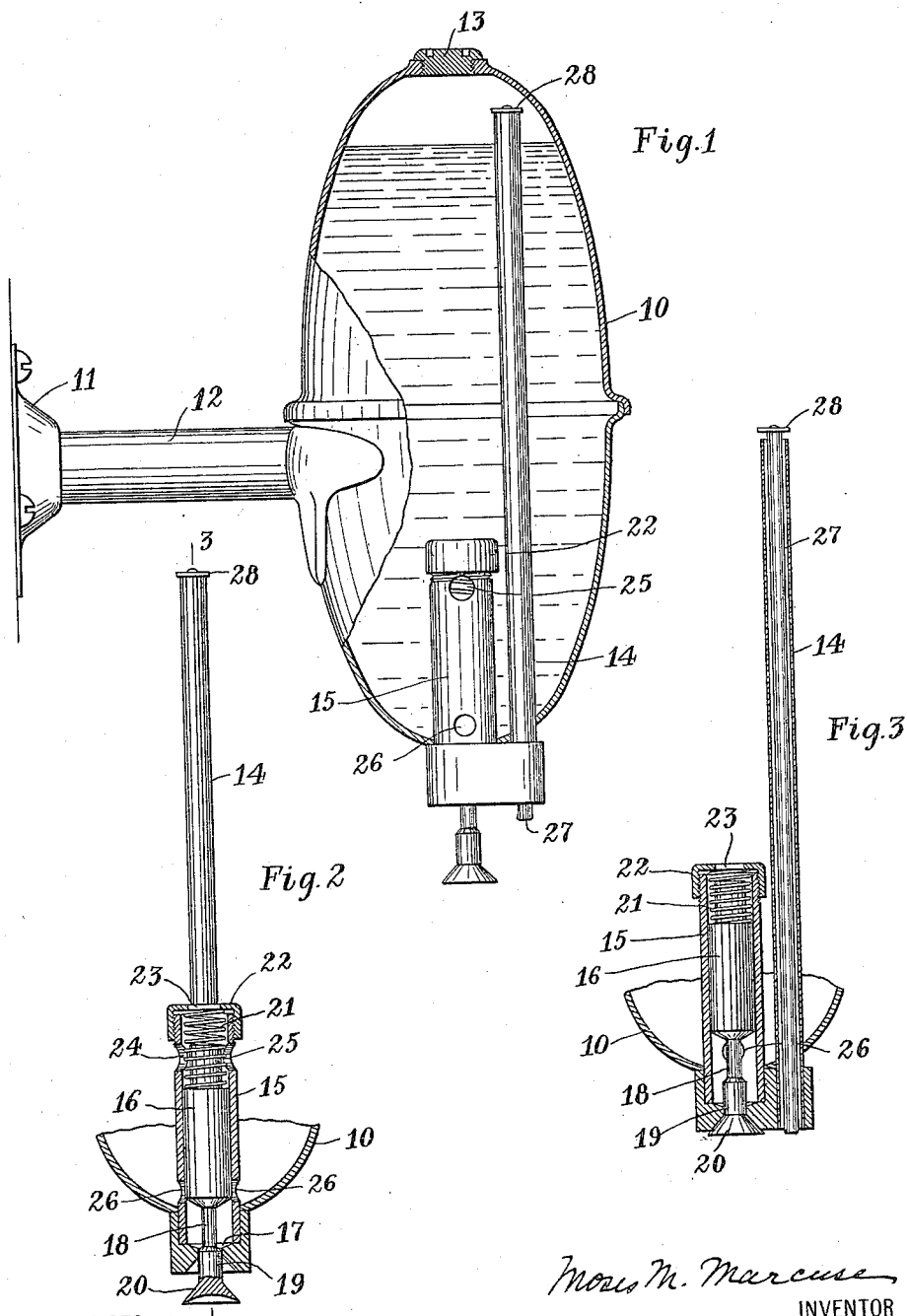

MOSES M. MARCUSE, OF NEW YORK, N. Y., ASSIGNOR TO WEST DISINFECTING COMPANY, A CORPORATION OF NEW YORK.

LIQUID-SOAP DISPENSER.

1,167,420.

Specification of Letters Patent.

Patented Jan. 11, 1916.

Application filed October 2, 1911. Serial No. 652,450.

*To all whom it may concern:*

Be it known that I, MOSES M. MARCUSE, a citizen of the United States, residing at city of New York, in the State of New York and county of New York, have invented certain new and useful Improvements in Liquid-Soap Dispensers; and I do hereby declare the following to be a full, clear, and exact description of the invention, such as will enable others skilled in the art to which it appertains to make and use the same.

The present invention has relation to an improvement in fixtures generally applied over wash stands and the like for the safe and convenient dispensing of regulated quantities of liquid soap. It is desirable that devices of this character should be simple in construction and so far as possible incapable of being put out of order by careless or malicious individuals. They should be pleasing in design and should be capable of delivering a predetermined quantity of a liquid soap at each operation unmixed with air so as to avoid froth and bubbles.

It is the object of this invention to provide a form of apparatus, which shall carry out these ends with the greatest efficiency.

The preferred embodiment of the invention is illustrated in the accompanying drawings, wherein—

Figure 1 is a side elevation of the device with a portion of one side removed, the moving parts being in their lowest and normal position. Fig. 2 is a rear elevation partly in section of the preferred form of plunger and vent showing the plunger partly raised, and Fig. 3 is a section on the line 3—3 of Fig. 2.

The casing 10, which may be of any desired shape is secured to a stand or to the wall by means of a bracket 11 and a suitable stem 12. The casing 10 is intended to contain the supply of liquid soap, the level of which is indicated in Fig. 1, which soap is introduced through an opening at the top of the casing, preferably closed by the screw cap 13. Into the bottom of the casing 10 are introduced the vent-tube 14, which extends up to a point above the level of the soap and the plunger casing 15 which is shorter and of greater diameter.

The plunger casing 15 contains the sliding plunger 16 fitting the interior of the casing fairly tightly but so as to move easily up and down. The plunger 16 at its lower end is intended to fit the seat 17 of the valve opening at the bottom of the device and a stem 18 extends from the center of the plunger 16 down through the valve opening. This stem has an enlargement 19, which closes the valve opening when the plunger is pressed upward as shown in Fig. 2 or Fig. 3, and this enlargement preferably terminates in a knob 20, the bottom surface of which is flat or slightly concaved so as to prevent the gathering of a drop of liquid upon the bottom of the stem in case of accidental leakage.

The top of the casing 15 contains a spring 21 which presses downward upon the plunger 16 and normally holds the stem down against the seat 17. The upper end of the plunger casing 15 is preferably closed by a cap 22 and openings 23, 24 and 25 are preferably provided in order to allow free circulation of the liquid when the plunger moves up and down. At the bottom of the casing 15 are provided openings 26 which are normally closed by the plunger 16 when it is depressed by the spring 21. These openings are so placed with relation to the enlargement 19 in stem 18, that when the plunger 16 is raised, the openings 26 begin to open just as the enlargement 19, first enters the valve opening. This condition is shown in Fig. 2. The pushing upward of the plunger 16 is then carried to the limit by the hand of the user as shown in Fig. 3, in which position the lower valve is tight closed and the openings 28 are fully opened to allow the space beneath the plunger and beneath the valve to entirely fill with liquid without admixture of air. Upon the user's hand being lowered, the spring 21 will cause the plunger 16 to descend and during the first part of the movement, a certain amount of liquid will flow back into the casing 10 through the openings 26; but as soon as the position shown in Fig. 2 is reached on downward movement, the valve will open and a predetermined quantity of the liquid will be ejected on the hand of the user by the descending plunger 16. At the end of the down stroke the plunger will be seated at 17 and leakage of the liquid will be prevented. If no air were admitted above the liquid, the result would, of course, be that a vacuum would form and it would not be long before the outward flow would stop. On the other hand, if a permanent opening is left above the level of the liquid, it is found difficult and expensive to make such a tight fit under the conditions of commercial use as to prevent dripping of the liquid to some slight extent.

In order to overcome these conditions, I have devised a special form of vent tube, a preferred form of which is shown in the drawings. This tube shown at 14 contains an operating rod 27 at the top of which is a soft metal cap 28 which rests upon the top of the tube and normally closes the vent. The weight of the rod 27 is enough to secure a sufficiently tight closure.

The bottom of the operating rod 27, projects below the bottom of the vent tube, as shown in Fig. 1, a sufficient distance so that as the hand of the operator is pushed up to raise the plunger 16 to the position shown in Fig. 3, the rod 27 and cap 28, will be slightly raised and a sufficient quantity of air will pass up through the vent tube and out under the cap 28, to compensate for the outflowing of liquid into the space below the plunger 16.

While I have shown the plunger casing and the vent tube fixed to a common support attached to the end of the casing 10, it is to be understood that I am not to be limited to either this or any of the other details of construction which I have shown and described, except in so far as the following claims are specifically confined to such details. It is also to be understood that my invention may be applied to other appropriate uses than that of dispensing soap.

What I claim is—

1. In a liquid dispensing device, an outer casing for holding the liquid, a plunger casing of substantially cylindrical form extending upward into said outer casing and having a bottom opening and a side opening, the latter communicating directly with the interior of the outer casing; in combination with a plunger within said plunger casing adapted to close both of said openings when in its normal and lowermost position, a spring tending to push said plunger downward, a stem on said plunger extending out through the bottom opening and an enlargement on said stem adapted to slide into said bottom opening and to close the same when said plunger is pushed above said side opening so as to open it, substantially as described.

2. A liquid dispensing device comprising in combination a casing, a positive liquid ejecting device normally in its inoperative position, lifting means for manually lifting said device into an operative position, a vent comprising a tube extending upward to a point above the intended level of liquid within said casing, an operating rod loosely placed within said tube, and extending below its lower extremity into the path of movement of the hand in operating said lifting means, and means at the upper end of said rod adapted to close the top of said vent tube, substantially as described.

3. In a liquid dispensing device a casing for the liquid, a vent comprising a tube extending upward to a point above the intended level of liquid in said casing, an operating rod loosely placed within said tube and extending below its lower extremity and a cap on said rod normally resting upon the top of said tube; in combination with a normally depressed ejecting plunger and a lifting stem therefor placed near the projecting end of the vent operating rod and of such a length as to permit appropriate successive normal operation of said plunger and of said vent, substantially as described.

In testimony whereof, I affix my signature, in presence of two witnesses.

MOSES M. MARCUSE.

Witnesses:
H. S. MACKAYE,
KATHARINE C. MEAD.

Copies of this patent may be obtained for five cents each, by addressing the "Commissioner of Patents, Washington, D. C."